3,241,985
TRANSPARENT CRYSTALLINE GLASS

Shigeo Kuwayama, Kanagawa-ken, Japan, assignor to Fuji Shashin Film Kabushiki Kaisha, Kanagawa-ken, Japan, a corporation of Japan
No Drawing. Filed Sept. 30, 1963, Ser. No. 312,274
Claims priority, application Japan, Feb. 2, 1962, 37/3,310
3 Claims. (Cl. 106—39)

This application is a continuation-in-part of my co-pending United States patent application Serial No. 185,839 filed April 9, 1962, and now abandoned.

This invention relates to transparent crystalline glass which has been prepared using $ZrO_2$ as the crystal nuclei forming agent.

In $Li_2O$—$Al_2O_3$—$SiO_2$ system glass with $TiO_2$ (2–20%) added as the crystal nuclei forming agent, the formation of crystals in the inner portion thereof can be controlled by heat treatment. When glass of this kind is heat treated, it becomes opaque or transparent and the properties such as the coefficient of thermal expansion and others are completely different from those of the starting material, as is already known. When $$Li_2O-Al_2O_3-SIO_2$$

system glass is prepared with $TiO_2$ (2–20%) as the crystal nuclei forming agent, the opaque product thus obtained is slightly yellowish but is not sufficiently colored as to be unsuitable for commercial purposes. When the product becomes transparent, the product becomes brown and the coloring is so noticeable that the resulting article is unsuitable for many commercial purposes.

Besides the above-mentioned process, processes for preparing crystalline glass by modifying $$Li_2O-Al_2O_3-MgO-SiO_2$$

system glass with $P_2O_5$ (5–22%) or $ZrO_2$ (5–10%) as the crystal nuclei forming agent are also known. In these systems, the coloring of the product is considerably reduced, but it is impossible to obtain transparent crystalline glasses. Furthermore the defoaming is very poor and crystalline glass of sufficiently small thermal expansion cannot be obtained with these compositions.

The present invention provides transparent crystalline glass which is obtained by melting $Li_2O$—$Al_2O_3$—$SiO_2$ system glass and adding $ZrO_2$ (2–5%) as the crystal nuclei forming agent at a temperature a little below the optimum fining temperature. The product thus obtained is almost colorless and possesses a small coefficient of thermal expansion at both low and high temperatures.

In general, when glass containing $ZrO_2$ is melted at a temperature a little below the optimum fining temperature, even the foams and striae are reduced but there is a tendency that numerous particles of very small size will be produced. The present invention utilizes this tendency.

The characteristic of crystalline glass of the present invention is that the permissible amount of $TiO_2$ which is the cause of coloring is very small or none so the coloring of crystalline glass obtained after the heat treatment is very little.

In general, the coefficient of thermal expansion of the product of the present invention is considerably smaller than that of products in which $TiO_2$ is the crystal nuclei forming agent.

For instance the coefficient of thermal expansion after thermal treatment is $9 \times 10^{-7}$ cm./cm.° C. for a glass having the composition of $SiO_2=67.1\%$, $TiO_2=5.9\%$, $LiO_2=4.3\%$, $Al_2O_3=20.7\%$, $K_2O=1.0\%$, $As_2O_3=0.5\%$ and $Sb_2O_3=0.5\%$.

The following glass composition is one embodiment of this invention wherein $ZrO_2$ is used as the crystal nuclei forming agent and its composition is $SiO_2=69.1\%$, $ZrO_2=3.0\%$, $Li_2O=4.4\%$, $Al_2O_3=21.3\%$, $K_2O=1.0\%$, $As_2O_3=0.5\%$ and $Sb_2O_3=0.5\%$. The coefficient of thermal expansion of this glass after thermal treatment is zero or almost zero.

As above stated, the product prepared by adding $ZrO_2$ as the crystal nuclei forming agent has a smaller coefficient of thermal expansion than that of the product obtained by adding $TiO_2$ as the crystal nuclei forming agent, so the former can withstand the effects of thermal impact up to a high temperature.

The glass composition of the product of the present invention is as follows (percentages are by weight):

|  | Broad, percent | Preferred, percent |
|---|---|---|
| $SiO_2$ | 65.0–75.0 | 67–72 |
| $Al_2O_3$ | 12.0–27.0 | 15–22 |
| $Li_2O$ | 1.7–4.5 | 2.2–4.5 |
| $ZrO_2$ | 2.0–5.0 | 2.0–3.0 |
| $(SiO_2+Li_2O+Al_2O_3)$ | >85 | >92 |

Furthermore, (1) It is preferable to add a small amount of $TiO_2$, for instance, up to 1.8%, when the amount of $ZrO_2$ is low.

(2) When the amount of $SiO_2$ exceeds the maximum, the glasses will become infusible. When the amount of $SiO_2$ is below the minimum, it becomes difficult to prepare a transparent crystalline glass.

(3) When the amount of $Al_2O_3$ exceeds the maximum, it becomes difficult to prepare a transparent crystalline glass.

(4) When the amount of $Al_2O_3$ is below the minimum, the coefficient of thermal expansion of the final transparent crystalline glass will be too high.

(5) When $Li_2O$ exceeds the maximum, it becomes difficult to obtain transparent crystalline glass. When the amount of $Li_2O$ is below the minimum, the product becomes infusible.

(6) When the amount of $ZrO_2$ exceeds the maximum, the product becomes infusible, and has a tendency to crack during the thermal treatment. When the amount of $ZrO_2$ is below the minimum, the ability to form the crystal nuclei is diminished, but the addition of a small amount of $TiO_2$ enables the preparation of the desired crystalline glass.

(7) When the total content of $(SiO_2+Al_2O_3+Li_2O)$ is below 85%, the characteristic of the present invention cannot be obtained.

(8) Other additives, for instance, $Na_2O$, $K_2O$, PbO, ZnO, BaO, SrO, CaO, MgO, etc. when added in small amounts, i.e. 3%, do not cause any major change to the characteristics of the present invention.

EXAMPLES

[All percentages herein are by weight]

| No. | 1 | 2 | 3 | 4 | 5 | 6 | 7 | 8 |
|---|---|---|---|---|---|---|---|---|
| $SiO_2$ | 69.1 | 68.4 | 68.8 | 68.0 | 68.5 | 67.7 | 72.3 | 74.3 |
| $TiO_2$ | | 1.0 | 0.5 | 1.6 | 1.6 | 1.7 | 1.7 | 1.8 |
| $Li_2O$ | 4.3 | 4.2 | 4.5 | 4.2 | 4.4 | 2.5 | 2.6 | 2.2 |
| $Al_2O_3$ | 21.7 | 21.5 | 21.2 | 21.0 | 21.2 | 21.2 | 17.0 | 15.2 |
| $ZrO_2$ | 3.0 | 3.0 | 3.0 | 2.3 | 2.3 | 2.0 | 2.3 | 2.4 |
| $As_2O_3$ | 0.5 | 0.5 | 0.5 | 0.4 | 0.5 | 0.5 | 0.5 | 0.5 |
| $Sb_2O_3$ | 0.5 | 0.5 | 0.5 | 0.5 | 0.5 | 0.5 | 0.5 | 0.5 |
| $K_2O$ | | | 1.0 | 1.0 | 1.0 | | | |
| $MgO$ | 0.9 | 0.9 | | | | 0.9 | 3.1 | 3.1 |
| $Na_2O$ | | | | 1.0 | | | | |
| $ZnO$ | | | | | | 3.0 | | |

| No. | 1 | 2 | 3 | 4 | 5 | 6 | 7 | 8 |
|---|---|---|---|---|---|---|---|---|
| Coefficient of thermal expansion of crystalline glass $10^{-7}$ cm./cm. ° C. (100–300° C.) | −3 | −5 | −4 | 3 | −5 | 11 | 12 | 14 |
| Coefficient of thermal expansion of glass, $10^{-7}$ cm./cm. ° C. (100–300° C.) | 45 | 44 | 44 | 50 | 44 | 32 | 35 | 33 |
| Transformation point of glass, ° C. | 713 | 698 | 707 | 689 | 714 | 697 | 704 | 734 |
| Surrendering point of glass, ° C. | 778 | 769 | 784 | 767 | 777 | 772 | 777 | 780 |
| Thermal treatment temperature, ° C. | 850 | 850 | 850 | 850 | 850 | 900 | 900 | 900 |
| Time for thermal treatment, hours | 2 | 2 | 2 | 2 | 2 | 2 | 2 | 2 |

The above described glass compositions were melted at a temperature of 1500–1630° C. for about 12 hours and the glasses thus obtained were heated at a temperature of 800–950° C. for about two hours to obtain the transparent crystalline glasses of this invention.

I claim:

1. A transparent crystalline glass having a low coefficient of thermal expansion and the following range of composition by weight:

| | Percent |
|---|---|
| $SiO_2$ | 65–75.0 |
| $Al_2O_3$ | 12.0–27.0 |
| $Li_2O$ | 1.7–4.5 |
| $ZrO_2$ | 2.0–5.0 |
| ($SiO_2$+$Li_2O$+$Al_2O_3$) | 85 |

2. A transparent crystalline glass having a low coefficient of thermal expansion and the following range of composition by weight:

| | Percent |
|---|---|
| $SiO_2$ | 67.0–72.0 |
| $Al_2O_3$ | 15.0–22.0 |
| $Li_2O$ | 2.2–4.5 |
| $ZrO_2$ | 2.0–3.0 |
| ($SiO_2$+$Li_2O$+$Al_2O_3$) | 92 |

3. Process for preparing a transparent crystalline glass having a low coefficient of thermal expansion which comprises melting a glass having the composition of claim 1, fining said glass for about 12 hours at a temperature between 1500 and 1630° C., and after said glass has been solidified, heat treating said glass at a temperature between 800° C. and 950° C. for about two hours.

No references cited.

TOBIAS E. LEVOW, *Primary Examiner.*

H. McCARTHY, *Assistant Examiner.*